E. P. REILLEY.
COMBINATION MULTIPLE VALVE AND LOCK.
APPLICATION FILED APR. 14, 1920.
1,387,073.  Patented Aug. 9, 1921.
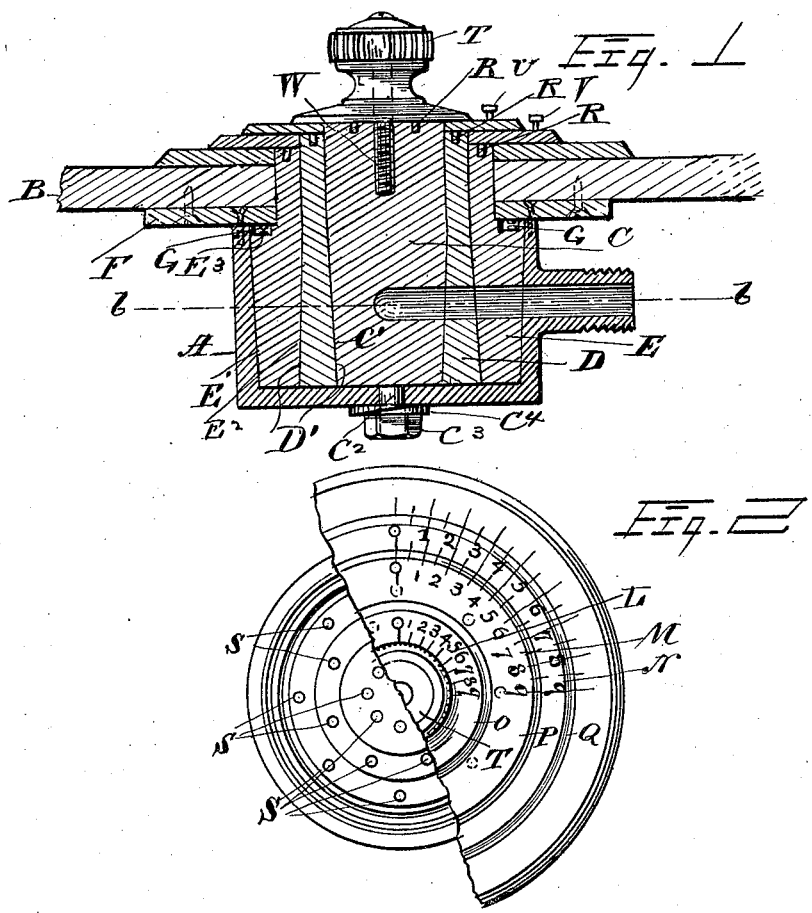
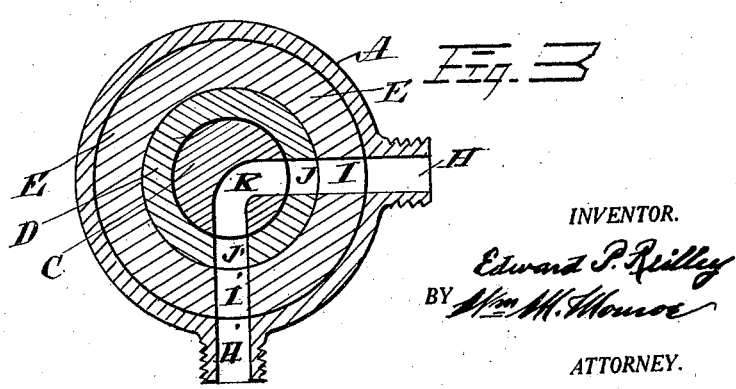
INVENTOR.
Edward P. Reilley
BY Wm. M. Monroe
ATTORNEY.

UNITED STATES PATENT OFFICE.

EDWARD P. REILLEY, OF CLEVELAND, OHIO.

COMBINATION MULTIPLE VALVE AND LOCK.

1,387,073.　　　　　Specification of Letters Patent.　　Patented Aug. 9, 1921.

Application filed April 14, 1920. Serial No. 373,746.

*To all whom it may concern:*

Be it known that I, EDWARD P. REILLEY, a citizen of the United States, and resident of Cleveland, in the county of Cuyahoga and State of Ohio, have invented certain new and useful Improvements in Combination Multiple Valves and Locks, of which I hereby declare the following to be a full, clear, and exact description, such as will enable others skilled in the art to which it appertains to make and use the same.

The objects of the invention are to provide a combination lock for a multiple valve in the gasolene supply pipe leading to the carbureter of an explosion engine, by means of which, when the valve or any one of the valve members is closed, it cannot again be opened to permit gasolene to flow unless the operator is familiar with the combination of the lock.

It includes means for setting the lock at any predetermined figure or combination of figures in relation to the positions of the several valve openings, and includes removable and adjustable dial plates, the angular positions of which can always be changed relatively to the positions of the several openings, so that the combination that will aline the openings to permit the gasolene to flow will be known only to the owner of the car.

It includes concentric conical valve members, and a casing therefor, and a corresponding number of dial plates, having graduated scales thereon, each valve member being provided with a passage, which when the valve is moved a predetermined distance upon its axis, will register with the passage in the other valve members and casing and form a continuous passage for gasolene therethrough.

The invention is hereinafter more fully described, shown in the accompanying drawings, and specifically pointed out in the claims.

In the accompanying drawings Figure 1 is a vertical central section of the device; Fig. 2 is a plan view —parts being broken away— and Fig. 3 is a transverse section on line $b$—$b$, Fig. 1.

In these views A is a casing, which is attached to the dash board or bracket B or to any convenient place for attachment. C is a central tapered valve, and concentric with this central valve are shown, the additional valves D and E, and the annular wall of the casing A. These valves are rotatable within the casing and the intermediate valve D is tapered outwardly at D', and the other valves are conical or tapered inwardly on their outer faces at C' and E' respectively and the valve E is provided with inwardly tapered inner faces $E^2$ complementary to the outward taper of the intermediate valve. The central valve is retained in position by means of the axial stem $C^2$ and nut and spring washer $C^3$ and $C^4$ respectively, and the outer valve is retained by means of the shoulder $E^3$ and the cover F of the casing.

A coiled spring G interposed between the cover and shoulder insures perfect joints as the valves wear from use and also maintains a tension upon the valves to keep them in position.

The oil supply passage passes through all these valves and the casing, as shown by the following path H, I, J, K, J', I' and H' and the rotation of any valve will destroy the continuity of the passage.

The position of each valve relatively to the others and the casing is determined by the graduated scales L, M, and N upon the several disks, O, P, and Q shown in Figs. 1 and 2.

These plates are connected operatively with their respective valves by means of pins R, which enter selectively the spaced openings S, in the outer edges of the valves.

By means of these pins and openings, the amount of movement of any one disk necessary to bring the several openings in alinement can be regulated at pleasure and knobs U and V are provided for turning the disks.

When it is desired to change the combination, the central knob T, can be released by unscrewing the screws or stud W, and all the disks can be placed in a readjusted position.

Having described the invention, what I claim as new and desire to secure by Letters Patent, is:

1. In a locking valve, the combination with a cylindrical casing having inlet and outlet openings arranged at an angle to each other, of an annular valve member having an outwardly tapered inner side, an intermediate annular valve tapered outwardly on its outer side and inwardly on its inner side, and a central inwardly tapering valve, and means for securing said inner and outer valves in said casing, said valves being provided with passages adapted to register with each other and with the openings in said casing.

2. In a locking valve, a casing having a cylindrical opening, said casing having inlet and outlet openings at an angle to each other, an annular valve rotatable in said casing and having an outwardly tapered inner side, an intermediate annular valve having its outer side tapered outwardly at its inner end and its inner side tapered inwardly at its inner end, a central inwardly tapered valve, said central intermediate and outer valves provided with horizontal passages adapted to register with said inlet and outlet openings in said casing, a closure for said casing, through which all said valves pass, said closure and outer valve being provided with engaging shoulders preventing the escape of said outer and intermediate valves and securing means for said inner or central valve.

3. In a locking valve, in combination, a cylinder casing, said casing having inlet and outlet openings at an angle to each other, an outer annular valve having an inwardly tapered outer surface and an outwardly tapering inner surface, an intermediate annular valve having its sides oppositely tapered, a tapered inner or central valve, said valves being provided with horizontal passages, adapted to register with said openings in said casing, and resilient means for securing said outer and inner valves in place.

In testimony whereof, I hereunto set my hand this 3″ day of April, 1920.

EDWARD P. REILLEY.

In presence of—
WM. M. MONROE,
CHAS. F. SIPE.